UNITED STATES PATENT OFFICE.

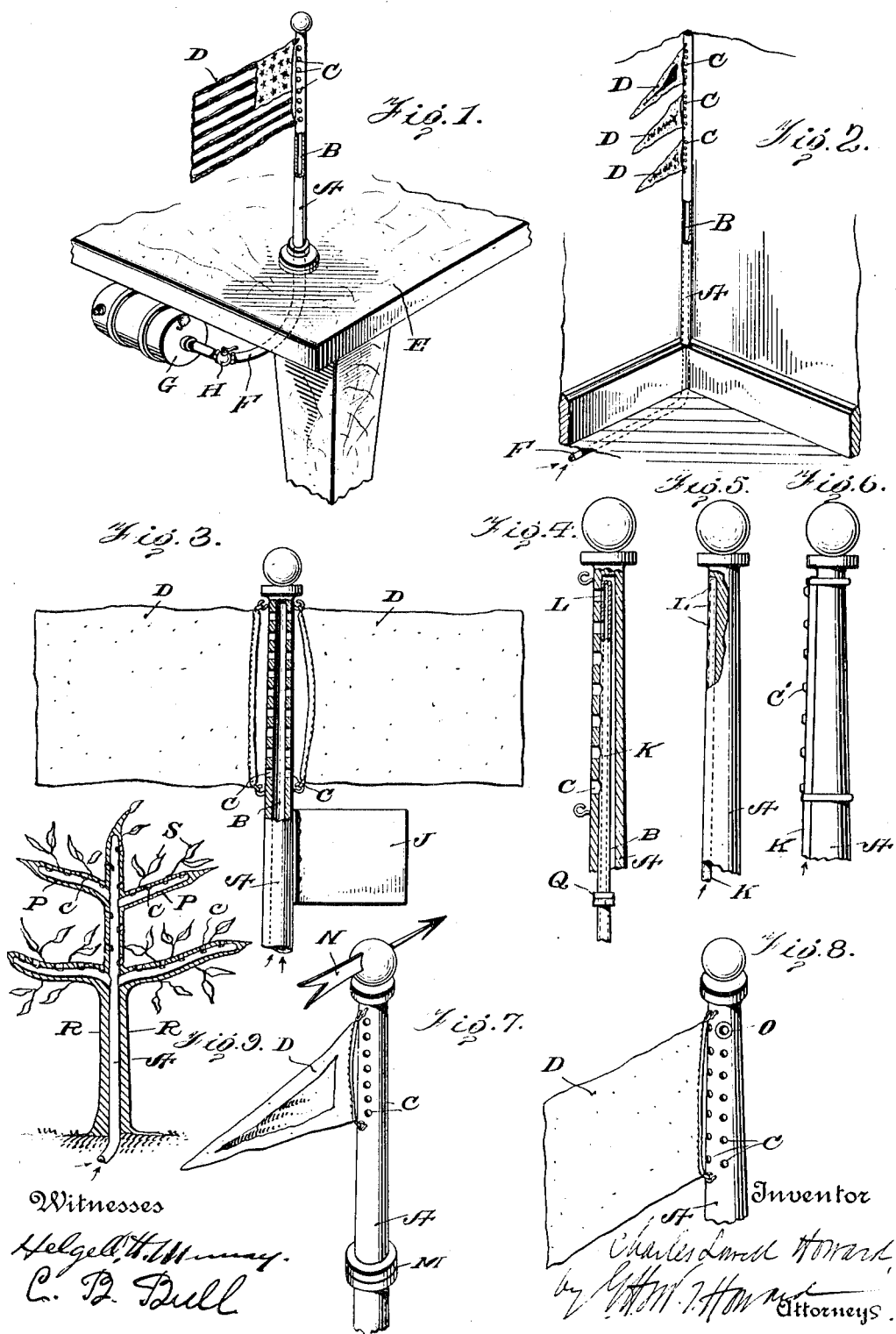

CHARLES LOWELL HOWARD, OF WASHINGTON, DISTRICT OF COLUMBIA.

PNEUMATICALLY-OPERATED DISPLAY DEVICE.

1,102,270.  Specification of Letters Patent.  Patented July 7, 1914.

Application filed August 7, 1911. Serial No. 642,710.

*To all whom it may concern:*

Be it known that I, CHARLES LOWELL HOWARD, a citizen of the United States, residing at Washington, in the District of Columbia, have invented new and useful Improvements in Pneumatically - Operated Display Devices, of which the following is a specification.

My invention relates to means for producing advertising, spectacular, decorative or other effects whereby air under pressure is admitted to a hollow body, such as a flag pole, and issues from orifices in said body onto an object, such as a flag, so as to give said object such motion as is produced by a natural current of air.

While in the drawings I have illustrated only two uses to which my invention may be put, namely, to give flags on poles and leaves on artificial trees, such motion as is naturally produced by wind action, I do not limit myself to any particular object capable of being waved or moved as by a natural current of air.

In the drawings, Figure 1 is a perspective view showing a form of the invention comprising a flag pole placed indoors, as upon a banquet table, counter, or the like, and used with a flag. Fig. 2 shows also an indoor arrangement wherein the device is placed in the corner of a room or apartment. Fig. 3 shows the invention adapted to indoor or outdoor use. Figs. 4, 5 and 6 show modifications. Fig. 7 indicates a further modification in which a section of the pole is provided with a swivel joint and vane. Fig. 8 shows a further modification hereinafter described. Fig. 9 represents the invention applied to an artificial tree for theatrical or other use in order to give the leaves such movement as is produced by a natural breeze.

Like parts are referred to in the following description and indicated in the respective figures of the drawings by the same reference characters.

I will now describe my invention as applied to a flag.

A represents a flag pole, hollow throughout as shown by B, but closed at its top.

C, C are orifices in the pole in front of which, or approximately so, is strung a flag D or the like.

The structure thus far described may be placed upon a table E, as of a banquet hall, or hung in any suitable manner indoors or in the open air. To the lower and open end of the pole is attached a flexible pipe F which in turn is connected to a tank G, supplied with compressed air from any suitable source, or directly to an air-forcing device.

My invention as applied to a flag operates as follows:—On opening the cock H, compressed air from the tank G or otherwise is admitted through the flexible pipe F. The air entering the pole A is forced through the hollow part B and out of the orifices C onto the flag D. It will be understood that the flag is thus set in motion as though struck by a natural current of air. While in this figure I have shown a single row of orifices C, it is obvious that two or more parallel rows of orifices may be used to advantage, as shown for example in Fig. 8. In this case the flag is strung between the two rows of orifices so as to receive an even distribution of air on each side. These orifices may or may not have nipples as shown by C'. To enhance the realistic effect I attach a whistle or whistles O to one or more of the orifices as shown in Fig. 8, thus producing the sound of the wind.

In Fig. 2 my invention is seen arranged in a corner of a room. At the meeting place of two walls, I attach a strip of wood A or other material, hollow throughout as at B, but closed at its top. Several flags or like objects are strung upon the strip A, each flag having its own set of orifices for the purpose described in connection with Fig. 1. As the air under pressure is sent through the pipe F and up through the hollow body A it will be understood that each flag will wave as though struck by a current of natural air. In this figure and in Fig. 1, the flexible air conducting pipe F is shown attached to the bottom of the object A. It is apparent that this flexible piping may enter the pole or other object from the side or at any point below the lowermost orifice. It is to be understood that in all forms of my invention the only escape of condensed air is through the orifices and upon the object to be moved.

In Fig. 3 is shown a flag pole A hollowed out as at B with orifices C arranged on opposite sides of the pole. In front of each row of orifices is strung a flag D. When air enters in the direction indicated by the arrow, and escapes through the orifices C, it is evident that the flags will blow in opposite directions. More than two flags may be arranged at different points of the circumference of the pole with the same effect. A plate J may be fastened to the pole A for the purpose of displaying advertising matter.

In operation it will be more satisfactory, in some instances, to have the air forced through the orifices against an object from an auxiliary tube within or without the pole or other body.

In Fig. 4 is shown a pole A in which is arranged a pipe K, said pipe having orifices L corresponding to those in the pole as indicated by C.

In Fig. 5 the pipe K is shown sunk in the side of the pole A, the air being forced directly from the orifices L onto the flag.

In Fig. 6 the pipe K is seen affixed to the outside of the pole. The same principle of invention is carried out when this auxiliary pipe K is used. The flag is strung upon the pole so as to be affected, as previously described, by the air emitted from the orifices L. It is to be understood that when an inner tube is used in connection with a pole or like object with orifices arranged as shown in Figs. 2, 3, 8, or in any other equivalent manner, the inner tube is provided with corresponding orifices in alinement with those of the outer pole.

Upon the pole A, as indicated in Fig. 7, I provide for the combination of a swivel joint M and a weather-vane N. When an inner pipe is used it also has upon it a swivel joint Q, as shown in Fig. 4, to enable it to turn simultaneously with the pole when guided by the weather vane. In the operation of my invention out of doors this joint and vane will enable the flag to turn with the breeze, even though it may not be of force sufficient to wave the flag. To enhance the striking effect of my invention the orifices may be placed so that the flag shall be waved as apparently by a current of air coming from a direction contrary to that induced by the vane.

In Fig. 9 the invention is seen applied to an artificial tree. In this instance, A represents the hollow body of the trunk, preferably constructed of piping, from which project similar hollow limbs P each closed at its end. At different points upon the limbs P are orifices C, similar to those on the flag pole previously described. Around this frame of piping artificial bark R may be arranged and leaves S hung adjacent to the orifices. Compressed air is now forced into the hollow body A, through the limbs P, and out of the orifices C upon the leaves S, thus giving them such natural wave or flutter as would be obtained by the force of a natural breeze.

For out of door use it will be seen that the invention is of practical and spectacular value at a time when there is practically no breeze stirring. There are many days in the year when flags and other objects are inanimate on account of the lack of air currents. By the employment of air under pressure, as herein shown and described, it will be seen that flags and other flexible objects capable of a waving or fluttering movement may upon calm days and at little expense be caused to wave.

For indoor purposes my invention may be used upon banquet tables, the theatrical stage, in show rooms and windows, and in various other ways.

I do not limit my invention to any particular size or construction, and it will be understood that it may be built in miniature, as for toys, or in sizes large enough for patriotic, political, commercial, advertising or other purposes.

Having thus described my invention, I claim:—

1. The combination of a hollow body with orifices therein, means for forcing air to said body and out of said orifices, and a flexible object carried by said hollow body in such proximity to said orifices as to be operated upon by the forced air, substantially as set forth.

2. The combination of a hollow body with orifices therein, means for rotating said hollow body, a whistle upon one or more orifices, means for forcing air to said hollow body and out of said orifices, and a flexible object carried by said hollow body in such proximity to said orifices as to be operated upon by the forced air, substantially as set forth.

3. The combination of a hollow body with a plurality of sets of orifices therein, means for rotating said hollow body, means for forcing air to said body and out of each set of orifices, and flexible objects carried by said hollow body each in such proximity to a set of orifices as to be operated upon by the forced air, substantially as set forth.

4. The combination of a hollow body with a plurality of sets of orifices therein, means for rotating said hollow body, means for forcing air to said hollow body and out of each orifice, flexible objects carried by said hollow body each in such proximity to a set of orifices as to be operated upon by the forced air, and whistling means acted on by said air, substantially as set forth.

5. The combination of a hollow body with orifices therein, a pipe within said hollow body with orifices corresponding to those in said hollow body, means for forcing air to said pipe and out of said corresponding orifices, a flexible object carried by said hollow body in such proximity to said corresponding orifices as to be operated upon by the forced air, and whistling means acted on by said air, substantially as set forth.

6. The combination of a hollow body with orifices therein, a pipe within said hollow body with orifices corresponding to those in the hollow body, means for rotating said hollow body and pipe simultaneously, means for forcing air to said pipe and out of said corresponding orifices, and a flexible object carried by said hollow body in such proximity to said corresponding orifices as to be operated upon by the forced air, substantially as set forth.

7. The combination of a hollow body with orifices therein, a pipe within said hollow body with orifices corresponding to those in said hollow body, means for rotating said hollow body and pipe simultaneously, means for forcing air to said pipe and out of said corresponding orifices, a flexible object carried by said hollow body in such proximity to said corresponding orifices as to be operated upon by the forced air, and whistling means acted on by said air, substantially as set forth.

8. The combination of a hollow body with a plurality of sets of orifices therein, a pipe within said hollow body with sets of orifices corresponding to those in the hollow body, means for forcing air to said pipe and out of said corresponding orifices, and a flexible object carried by said hollow body in such proximity to said orifices as to be operated upon by the forced air, substantially as set forth.

9. The combination of a hollow body with a plurality of sets of orifices therein, a pipe within said hollow body with sets of orifices corresponding to those in the hollow body, means for rotating said hollow body and pipe simultaneously, means for forcing air to said pipe and out of said corresponding orifices, and a flexible object carried by said hollow body in such proximity to said orifices as to be operated upon by forced air, substantially as set forth.

10. The combination of a hollow body with a plurality of sets of orifices therein, a pipe within said hollow body with orifices corresponding to those in said hollow body, means for forcing air to said pipe and out of said corresponding orifices, a flexible object carried by said hollow body in such proximity to said orifices as to be operated upon by forced air, and whistling means acted on by said air, substantially as set forth.

11. The combination of a hollow body with a plurality of sets of orifices therein, a pipe within said hollow body with orifices corresponding to those in said hollow body, means for rotating said hollow body and pipe simultaneously, means for forcing air to said pipe and out of said corresponding orifices, a flexible object carried by said hollow body in such proximity to said orifices as to be operated upon by forced air, and whistling means acted on by said air, substantially as set forth.

12. A tubular supporting member having means for egress of air admitted to its interior, and a source of compressed air communicating with the interior of said member, combined with a flexible object associated with said member in proximity to the egress of air therefrom, whereby the air shall strike said flexible object and the latter shall thereby be given a waving or fluttering movement, substantially as set forth.

In testimony whereof I affix my signature in presence of two witnesses.

CHARLES LOWELL HOWARD.

Witnesses:
G. H. HOWARD,
C. B. BULL.